(12) United States Patent
Gupta et al.

(10) Patent No.: US 10,997,222 B2
(45) Date of Patent: May 4, 2021

(54) CONVERSATIONAL AGENT DIALOG FLOW USER INTERFACE

(71) Applicant: International Business Machines Corporation, Armonk, NY (US)

(72) Inventors: Ajay Kumar Gupta, New Delhi (IN); Pratyush Kumar, Chennai (IN); Sachindra Joshi, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 16/024,557

(22) Filed: Jun. 29, 2018

(65) Prior Publication Data
US 2020/0004874 A1    Jan. 2, 2020

(51) Int. Cl.
G06F 16/332    (2019.01)
G06F 3/16      (2006.01)
G10L 15/22     (2006.01)

(52) U.S. Cl.
CPC .......... *G06F 16/3329* (2019.01); *G06F 3/167* (2013.01); *G10L 15/22* (2013.01); *G10L 2015/225* (2013.01)

(58) Field of Classification Search
CPC ...... G06F 16/3329; G06F 3/167; G06F 40/35; G06F 16/9024; G06F 8/38; G10L 15/22;
(Continued)

(56) References Cited

U.S. PATENT DOCUMENTS 6,321,198 B1 * 11/2001 Hank ................. H04M 3/4936
                                                  704/270
6,823,313 B1 * 11/2004 Yuchimiuk ............. G10L 15/22
                                                  704/257
(Continued)

OTHER PUBLICATIONS

Benjamin Perkins, "How I tested debugged my chatbot that I created using the Bot Services on Azure", Microsoft Developer, Dec. 1, 2016, 1 page, at: https://blogs.msdn.microsoft.com/benjaminperkins/2016/12/01/how-i-tested-my-chatbot-that-i-created-using-the-bot-services-on-azure/.

*Primary Examiner* — Angela A Armstrong
(74) *Attorney, Agent, or Firm* — Ference & Associates LLC (57) ABSTRACT

One embodiment provides a method, including: obtaining a plurality of chatlogs involving a conversational agent, wherein the plurality of chatlogs represent interactions between users and the conversational agent; identifying dialog states of the conversational agent, wherein each dialog state corresponds to a possible response by the conversational agent; generating a dialog tree including one or more dialog flows of the conversational agent, wherein a dialog flow represents an interaction that occurred between the conversational agent and a user; and providing a conversational reflow user interface for a conversational reflow system allowing execution of the conversational agent to mimic interactions between users and the conversational agent, wherein the conversational reflow system advances through dialog flows based upon input provided by a user at the conversational reflow user interface and the conversational reflow user interface displays output based upon the dialog states of the dialog tree.

18 Claims, 3 Drawing Sheets

(58) Field of Classification Search
CPC . G10L 2015/225; H04L 51/02; H04L 51/046; H04L 51/063; H04L 51/066
See application file for complete search history.

(56) References Cited

U.S. PATENT DOCUMENTS

| | | | |
|---|---|---|---|
| 7,024,348 B1* | 4/2006 | Scholz | G06F 8/38 703/24 |
| 7,861,170 B2* | 12/2010 | Khosla | G10L 15/26 715/712 |
| 8,949,725 B1 | 2/2015 | Goncharuk et al. | |
| 9,473,637 B1* | 10/2016 | Venkatapathy | G06F 16/90332 |
| 10,574,597 B2* | 2/2020 | Johnson, Jr. | H04L 51/046 |
| 2010/0063823 A1* | 3/2010 | Wu | G10L 15/18 704/275 |
| 2010/0280819 A1* | 11/2010 | Ozkaragoz | G06F 40/58 704/9 |
| 2012/0081371 A1* | 4/2012 | Ozkaragoz | G06F 8/38 345/467 |
| 2014/0032471 A1* | 1/2014 | Reddy | G10L 15/22 706/47 |
| 2014/0122083 A1 | 5/2014 | Xiaojiang | |
| 2014/0122619 A1 | 5/2014 | Duan | |
| 2014/0341369 A1 | 11/2014 | Chang et al. | |
| 2017/0316777 A1* | 11/2017 | Perez | G06F 40/35 |
| 2019/0034409 A1* | 1/2019 | Curtis | G06F 40/123 |
| 2019/0058793 A1* | 2/2019 | Konig | H04M 3/5175 |
| 2019/0089656 A1* | 3/2019 | Johnson, Jr. | H04L 51/046 |
| 2019/0156821 A1* | 5/2019 | Zamora Duran | G10L 15/24 |
| 2019/0213284 A1* | 7/2019 | Anand | G06F 9/453 |

* cited by examiner

CONVERSATIONAL AGENT DIALOG FLOW USER INTERFACE

BACKGROUND

When a user has a problem or question the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation.

BRIEF SUMMARY

In summary, one aspect of the invention provides a method comprising: obtaining a plurality of chatlogs involving a conversational agent, wherein the plurality of chatlogs represent interactions between users and the conversational agent; identifying dialog states of the conversational agent, wherein each dialog state corresponds to a possible response by the conversational agent; generating, from the plurality of chatlogs, a dialog tree including one or more dialog flows of the conversational agent, wherein a dialog flow represents an interaction that occurred between the conversational agent and a user and wherein the dialog tree (i) includes possible dialog states of the conversational agent and (ii) identifies the frequency of transitions between identified dialog states; and providing a conversational reflow user interface for a conversational reflow system, the conversational reflow system allowing execution of the conversational agent to mimic interactions between users and the conversational agent, wherein the execution is based upon the dialog tree, wherein the conversational reflow system advances through dialog flows based upon input provided by a user at the conversational reflow user interface and the conversational reflow user interface displays output based upon the dialog states of the dialog tree.

Another aspect of the invention provides an apparatus, comprising: at least one processor; and a computer readable storage medium having computer readable program code embodied therewith and executable by the at least one processor, the computer readable program code comprising: computer readable program code configured to obtain a plurality of chatlogs involving a conversational agent, wherein the plurality of chatlogs represent interactions between users and the conversational agent; computer readable program code configured to identify dialog states of the conversational agent, wherein each dialog state corresponds to a possible response by the conversational agent; computer readable program code configured to generate, from the plurality of chatlogs, a dialog tree including one or more dialog flows of the conversational agent, wherein a dialog flow represents an interaction that occurred between the conversational agent and a user and wherein the dialog tree (i) includes possible dialog states of the conversational agent and (ii) identifies the frequency of transitions between identified dialog states; and computer readable program code configured to provide a conversational reflow user interface for a conversational reflow system, the conversational reflow system allowing execution of the conversational agent to mimic interactions between users and the conversational agent, wherein the execution is based upon the dialog tree, wherein the conversational reflow system advances through dialog flows based upon input provided by a user at the conversational reflow user interface and the conversational reflow user interface displays output based upon the dialog states of the dialog tree.

An additional aspect of the invention provides a computer program product, comprising: a computer readable storage medium having computer readable program code embodied therewith, the computer readable program code executable by a processor and comprising: computer readable program code configured to obtain a plurality of chatlogs involving a conversational agent, wherein the plurality of chatlogs represent interactions between users and the conversational agent; computer readable program code configured to identify dialog states of the conversational agent, wherein each dialog state corresponds to a possible response by the conversational agent; computer readable program code configured to generate, from the plurality of chatlogs, a dialog tree including one or more dialog flows of the conversational agent, wherein a dialog flow represents an interaction that occurred between the conversational agent and a user and wherein the dialog tree (i) includes possible dialog states of the conversational agent and (ii) identifies the frequency of transitions between identified dialog states; and computer readable program code configured to provide a conversational reflow user interface for a conversational reflow system, the conversational reflow system allowing execution of the conversational agent to mimic interactions between users and the conversational agent, wherein the execution is based upon the dialog tree, wherein the conversational reflow system advances through dialog flows based upon input provided by a user at the conversational reflow user interface and the conversational reflow user interface displays output based upon the dialog states of the dialog tree.

A further aspect of the invention provides a method, comprising: obtaining a plurality of execution logs involving a conversational agent, wherein the plurality of execution logs represent interactions of users with the conversational agent; producing, from the plurality of execution logs, producing, from the plurality of execution logs, a dialog tree including one or more dialog flows of the conversational agent, wherein a dialog flow represents an interaction that occurred between the conversational agent and a user and wherein the dialog tree (i) includes possible dialog states of the conversational agent and (ii) identifies the frequency of transitions between dialog states of the conversational agent, wherein a dialog state corresponds to a possible conversational turn provided by the conversational agent; the dialog tree comprising (i) a plurality of nodes, each node corresponding to a dialog state, and (ii) a plurality of edges connecting two of the plurality of nodes, each edge corresponding to one or more user responses that result in a transition from one of the nodes connected by the edge to the other of the nodes connected by the edge; and providing a conversational agent dialog flow user interface for a conversational agent system, the conversational agent system allowing execution of the conversational agent to mimic interactions between users and the conversational agent, wherein the execution is based upon the dialog tree, wherein the conversational reflow system advances through dialog flows based upon input provided by a user at the conversational reflow user interface and the conversational reflow user interface displays output based upon the dialog states of the dialog tree.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Conversational agent developers attempt to make conversational agents that respond to users accurately and in a human-like manner. The artificial intelligence that conversational agents use has become better at allowing the conversation to become more accurate and closer to a conversation with another person. For example, the natural language generation and understanding has improved, so that the conversational agent system can more accurately identify the user request and provide a more accurate response or result. Additionally, using data analytics and collaborative filtering has also made the conversation system more accurate and more human-like.

A conversational agent is programmed or designed by a conversational agent designer/programmer/developer who provides the design of the dialog flow. The dialog flow includes multiple nodes, each representing a dialog state identifying a possible response that can be provided by the conversational agent. As the conversation progresses, the conversational agent processes input received from a user and accesses a node within the dialog flow that is responsive to the received input. Thus, the conversational agent designer creates the nodes and provides an algorithm to the conversational agent so that the conversational agent can select and traverse nodes of the dialog flow. However, in order for conversational agent developers to determine whether the dialog flow is effective, the developer has to manually evaluate the dialog flow. Generally this manual evaluation is performed by accessing chat or execution logs of the conversational agent.

The chat or execution logs include a transcript or log of interactions of users with the conversational agent. The logs include recordings of the responses or input provided by a user and indicate which node(s) within the dialog flow that the conversational agent accessed to respond to the user. The developer can use the responses provided by users to different dialog flow nodes to identify how the user is responding to the conversational agent, and, therefore, whether the conversational agent is effective in responding to the user. Based upon this analysis the developer can restructure the dialog flow or user interface of the conversational agent to make the agent more accurate and effective. However, chatlogs are unstructured, lengthy, and difficult to browse.

Therefore, the developer manually accessing and reviewing the chatlogs results in a lengthy process that is both time-consuming and ineffective.

Accordingly, the techniques and systems as described herein provide a system and technique for providing a conversational agent dialog flow user interface from conversational agent chatlogs. The system obtains a plurality of chatlogs (also referred to as "execution logs") related to a conversational agent. The system also identifies dialogs states of the conversational agent. The dialog states correspond to possible responses by the conversational agent. In other words, the dialog states represent a possible conversational turn of the conversational agent. Identification of dialog states may be performed by accessing the model of the conversational agent and extracting the dialog states. Additionally or alternatively, identification of dialogs states may be performed by analyzing the chatlogs to classify each conversational turn by the conversational agent as a dialog state.

From the chatlogs the system generates a dialog tree that represents the dialog flow of the conversational agent. The dialog tree includes nodes that represent each dialog state and edges that connect two of the nodes. Each edge represents a transition from one node or dialog state to another node or dialog state and, therefore, represents a response, input, or utterance provided by a user that caused the transition from one node to another node. The dialog tree also identifies the frequency of transitions between identified dialog states. In other words, the dialog tree identifies how often a user response results in a transition from one dialog state to another dialog state. From the dialog tree the system can provide a conversational reflow or dialog flow user interface for a conversational reflow system. The user interface allows a user or developer to interact with the dialog tree of the conversational agent by providing different inputs that cause the system to execute the conversational agent dialog flow. In other words, the user interface provides an interface that allows the developer to execute the conversational agent in a mode similar to how software programs are executed in a debug mode. Thus, the user interface provides different input icons that are similar to a software program debug mode and allows the developer or user to advance sequentially through the dialog flow of the conversational agent.

Such a system provides a technical improvement over current systems for improving conversational agents by providing a system that provides a user interface that allows access to the conversational agent design and dialog flow. The systems and methods as described herein can generate a dialog tree from chat or execution logs. Using the dialog tree the system provides a user interface that can execute like the conversational agent during execution. Using the user interface, a developer or other user can provide input to the user interfaces that causes the conversational agent to respond in a particular manner. The user interface therefore allows the developer to identify how the users have responded to the conversational agent during implementation of the conversational agent and how the conversational agent responds to the users, thereby allowing the developer to understand the effectiveness of the conversational agent without the developer having to manually review and analyze the chat or execution logs. In other words, the described system provides a technical improvement over current systems by providing a system that can automatically parse and analyze the lengthy and unstructured conversational agent execution logs in order to create a user-friendly and intuitive user interface that allows the developer to analyze the conversational agent design without having to undergo the lengthy, tedious, and ineffective manual analysis process, as provided in conventional methods and techniques.

Figure 1:
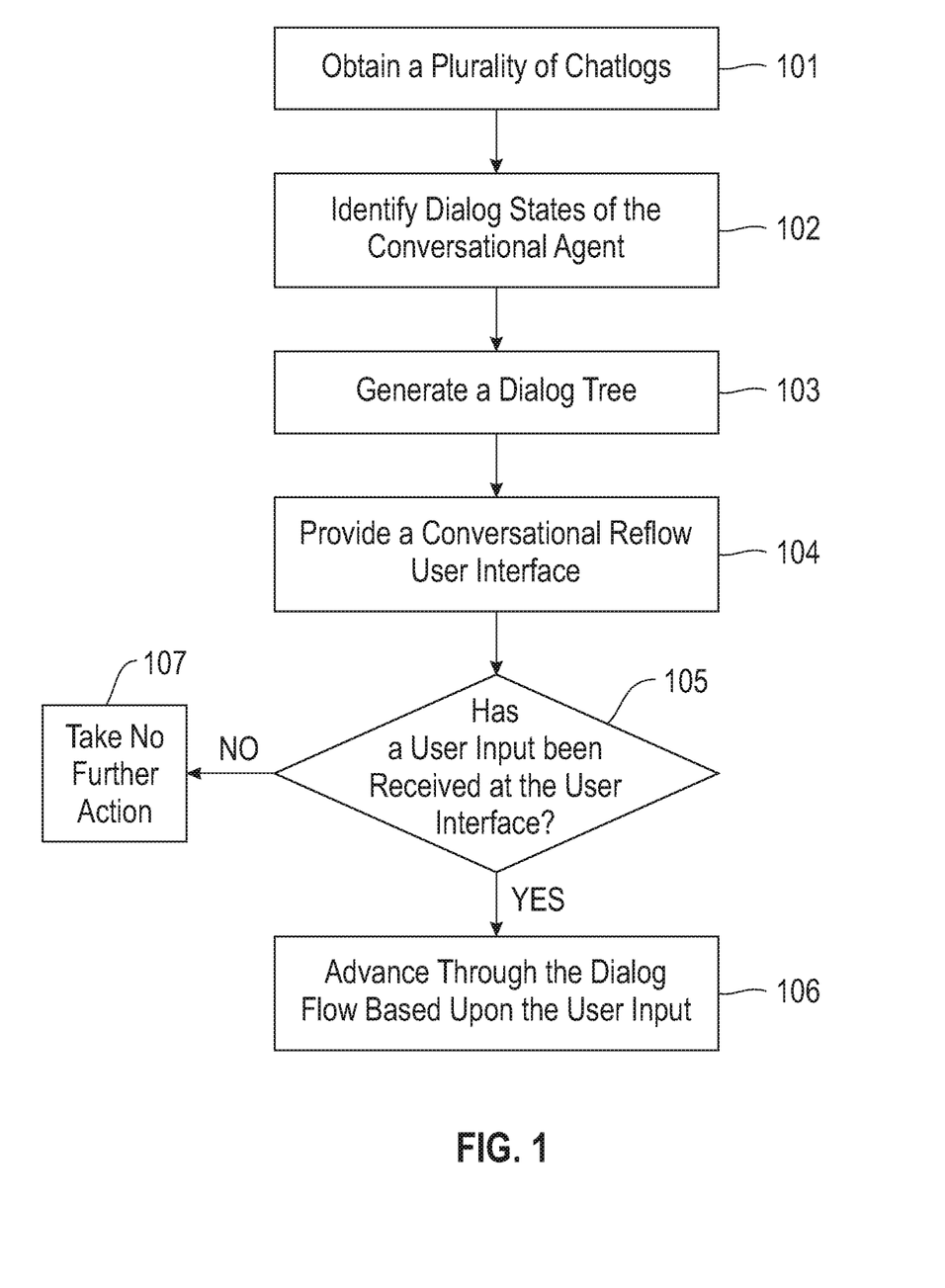
FIG. 1 illustrates a method of providing a conversational agent dialog flow user interface from a plurality of chatlogs.

FIG. 1 illustrates a method for providing a conversational agent dialog flow user interface from conversational agent chatlogs. At 101 the system may obtain a plurality of chatlogs related to a conversational agent. Obtaining the chatlogs may include a user providing the chatlogs to the system, for example, uploading the information to the system, providing the information to a data storage location accessible by the system, or the like. Alternatively, the system may proactively capture or obtain the information, for example, by accessing a repository associated with the conversational agent, running as a background application with the conversational agent, or the like. Obtaining the chatlogs may include any combination of the identified techniques or any other technique that can be used to obtain the chatlogs. The chatlogs may also be received while the conversational agent is live or deployed. In other words, the described system does not require that the conversational agent is taken out of service in order to analyze the chatlogs.

The chatlogs may include transcripts or other logs that correspond to interactions between users and the conversational agent. In other words, while the conversational agent is deployed, the conversational agent system or other system associated with the conversational agent records information related to the conversational agent, including recording interactions between users and the conversational agent. These recorded interactions may include a transcript of the input, response, or utterance provided by the user and then the response provided by the conversational agent. Each of the responses provided by either the user or the conversational agent may be referred to as a conversational turn. The recorded interactions may include additional information, for example, a timestamp of when each conversational turn is received/provided, identification information identifying the user and/or conversational agent, metadata associated with the responses or conversational agent, and the like.

At 102 the system may identify dialog states of the conversational agent where each dialog state corresponds to a possible response by the conversational agent. In other words, a dialog state corresponds to a possible conversational turn that could be provided by the conversational agent. Not all dialog states may be accessed by the conversational agent during every interaction. To identify the dialog states the system may access a dialog or conversation model corresponding to the conversational agent that identifies the different dialog states. A dialog or conversation model may include the model created by the programmer or designer that identifies the different dialog states or nodes that correspond to possible responses that can be provided by the conversational agent. Accordingly, in the case that a model is accessible to or provided to the system, to identify the dialog states the system may simply read from the model and identify the nodes within the model.

Alternatively or additionally, identification of the dialog states may include identifying conversational turns within the plurality of chatlogs and classifying each of the identified conversational turns to a dialog state. In other words, the system may analyze the dialog logs and identify responses provided by the conversational agent. The system may then classify each of these responses to a dialog state. In other words, since dialog states correspond to possible responses provided by the conversational agent, the system can attribute a response provided by the conversational agent to a dialog state. Using a plurality of dialog logs, the system can identify the different dialogs states that are included in the design of the conversational agent. In other words, with a plurality of dialog logs the system can generate a type of dialog model for the conversational agent. Additionally, the dialog logs provide an indication of a frequency of occurrence of each of the dialog states. In other words, the dialog logs provide an indication of how often a dialog state occurs during conversations with a user.

At 103 the system may generate a dialog tree including one or more dialog flows of the conversational agent. A dialog flow represents a programmed conversational flow of the conversational agent. The dialog flow indicates which responses should be provided by the conversational agent when responses are received at the conversational agent. In other words, the dialog flow represents the different dialog states that are accessed by the conversational agent during an interaction with a user. Generating the dialog tree may include parsing and analyzing the chatlogs to identify the responses provided by the users in order to identify the user input that results in a transition from one dialog state to another dialog state. Thus, the system automatically analyzes the chatlogs to generate the dialog tree, thereby eliminating the need for a developer to manually analyze the chatlogs. In generating the dialog tree the system may identify the frequency of transition between identified dialog states using the plurality of chatlogs. In other words, the system may identify how often user responses in the chatlogs result in a transition from one dialog state to another dialog state.

Each transition from one dialog state to another dialog state may be the result of different user responses. In other words, multiple user response types can result in a transition between one dialog state and another dialog state. Therefore, the system may cluster different user utterances or responses at each transition. Clustering the different user utterances, responses, or inputs may be performed using language features such as utterance embedding, intent identification, entity identification, and the like. These clusters may represent user utterances, responses, or inputs that are similar and that could be provided by a user that would result in the transition from the first dialog state to another dialog state.

The dialog tree may be represented as a plurality of nodes and edges. Each node within the dialog tree may correspond to a different dialog state. Each edge connects two of the nodes within the tree and represents a transition from one node connected by the edge to the other node connected by the edge. Therefore, each edge may represent a user utterance, input, or response that results in the transition from the first connected node to the second connected node. Since different user inputs may result in a transition between the same nodes, each node may have more than one connecting edge, including more than one edge connecting the same two nodes. In other words, a single node can be transitioned to from more than one node and two nodes may have multiple user inputs that result in the transition between the two nodes. The edges may include additional information, for example, the frequency of the transition between the two nodes.

At 104 the system may provide a conversational reflow or dialog flow user interface for a conversational reflow system. The user interface allows interaction with the dialog tree of the conversational agent. In other words, the user interface provides a user-friendly technique that allows a conversational agent developer to advance through the dialog tree to identify the effectiveness of the conversational agent using the chatlogs without the developer having to manually analyze the unstructured information included in the chatlogs. The user interface advances through the dialog flow, similar to a software program debug program, based upon input provided by a user or developer. The input indicates how the conversational reflow system should advance through the dialog flow. Based upon this input, the conversational reflow system provides output using the dialog tree. In other words, the user interface allows a developer to provide input that indicates how the conversational reflow system should advance through the dialog tree, in which the conversational reflow system provides output, using the dialog tree, through the user interface that is representative of how the conversational agent would provide output during deployment.

Figure 2:
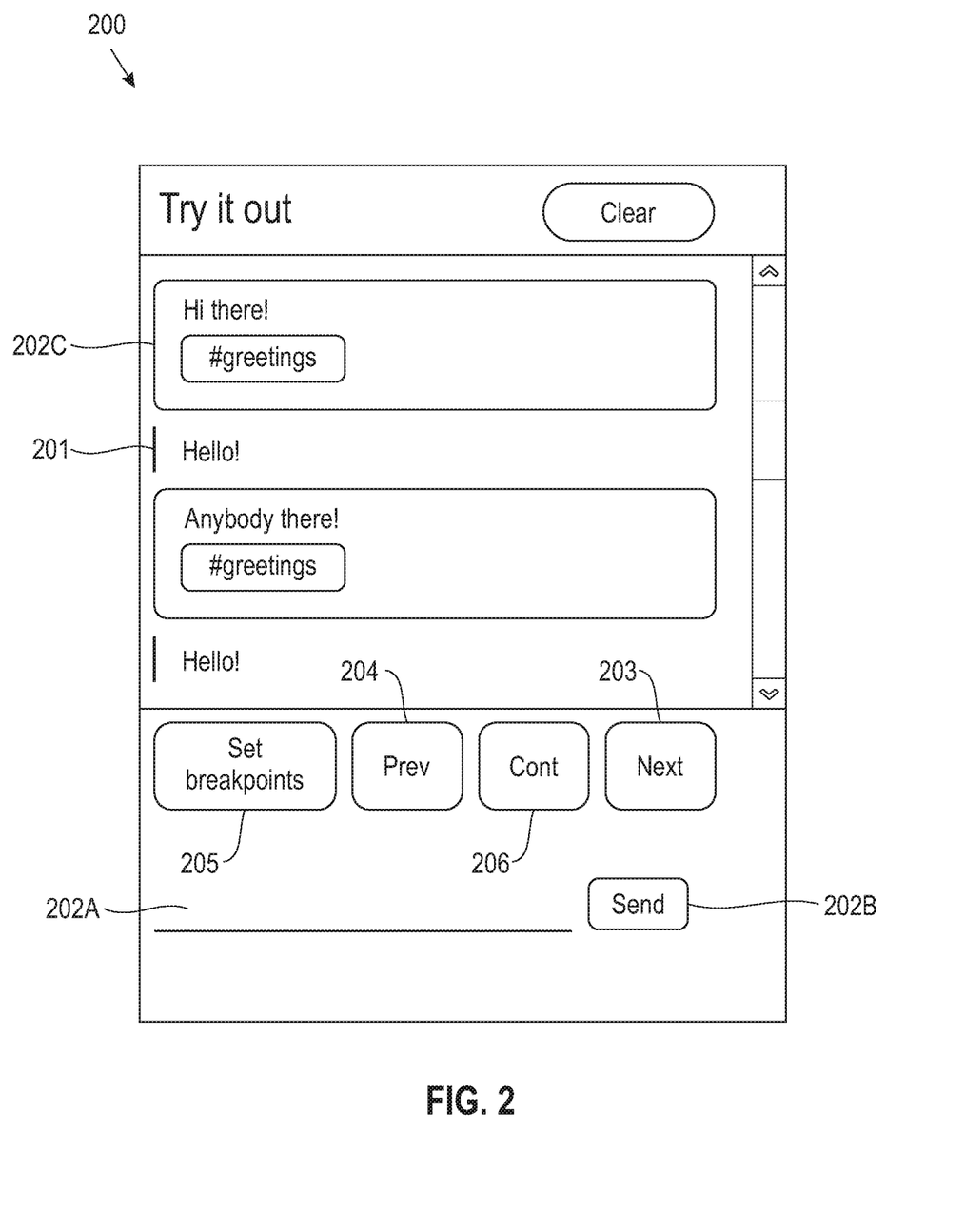
FIG. 2 illustrates an example conversational agent dialog flow user interface.

FIG. 2 illustrates an example user interface 200. This user interface is merely an example and other user interfaces, user interface layouts, and the like, are possible and contemplated. The user interface includes a window that includes the input provided by the user 202C and responses provided by the conversational agent 201. The user interface also provides an input area for user input 202A and a send button 202B that submits the user input to the conversational agent. These areas may be similar to what a user would see when interfacing with the deployed conversational agent. This user interface 200 also includes an indication of the transition, for example, in FIG. 2 "#greetings". This transition may correspond to an edge within the dialog tree. In other words, the conversational reflow system has categorized the user input into a transition so that it can provide a response corresponding to a dialog state that is connected to the transition within the dialog tree.

The conversational reflow system allows two different modes, an auto mode and a standard mode. In the standard mode, a user or developer provides the user input in the user input area. The system then uses the dialog tree to provide responses to the user input. Alternatively, the conversational reflow system may be executed in auto mode. In this mode, the system will advance through the dialog flow using the dialog tree automatically. In other words, the system automatically generates user responses or utterances that cause transitions between different dialog states, thereby allowing playback of a chatlog. Using this playback, the developer can identify areas where the conversational agent is ineffective.

In order to advance through the dialog flow in auto mode, the user interface provides an icon, button, or other user input interface, for example, a "next" icon 203, that advances to the next dialog state. To make this advancement, the system identifies the trajectory of the current conversation based upon the conversation thus far and also identifies the current dialog. The system then searches through the chatlogs and identifies all interactions which have at least one dialog state or conversational turn where the conversation context and/or dialog node match that of the current conversation. This filtered list of conversations is then used by the system to generate a list of all user inputs that are typically provided by the user in the context of the current conversation. The system clusters these inputs based upon semantic properties, for example, entities, intents, and the like, based on the conversational agent model with generic language properties (e.g., vector embedding, etc.). From the clustered inputs the system can select one or more possible user inputs that could be provided. Depending on a user setting, the system may automatically select one of the user inputs for provision in order to advance to a new dialog state. Alternatively, the system may provide a drop-down menu including one or more possible user inputs and the user or developer may select one of them for provision in order to advance to a new dialog state.

The user interface also provides an icon, button, or other user input interface, for example, a "prev" icon 204, that returns to a previous dialog state. In other words, the "prev" icon 204 causes the system to backtrack one step. As the system advances through the dialog flow, the system writes to a local chatlog repository that stores the responses and conversational turns provided by the conversational agent and the user inputs that are either provided or selected manually by a user or automatically generated by the system. This local chatlog repository maintains the sequences of user inputs and the conversational state of the current conversation. Thus, when the system is requested to backtrack, the system accesses the local chatlog repository and rolls back the conversational state to the previously provided user input. Additionally, the system removes entry of the last user input, the user input that was provided to move to the dialog state that is currently being transitioned back from, from the local chatlog repository. The system also removes the last user input from the user interface and the conversational agent internal state is updated to the state of the conversational agent after receipt of the previous user input. In other words, the system returns the conversational agent and user interface to the state before the last user input that was subsequently removed. This step-back mode allows the developer to back through the executed chatlog.

The user interface also provides an icon, button, or other user input interface, for example, a "Set breakpoints" icon 205, that identifies a particular dialog state that the developer wants the conversational reflow system to advance the dialog flow to. To set the breakpoint, the user is shown a user interface that allows the developer to specify a Boolean condition as a conjugation of assertion on dialog nodes, intents, and entities, also referred to as a breakpoint condition. The conversational reflow system uses this condition to filter all conversation in the chatlog to identify the chatlogs that have a conversational path between the current conversational context of the current conversation and the conversational context modelled by the breakpoint condition. This filter can also be applied to the chatlogs in connection with the "next" 203 icon. In other words, if the developer sets the breakpoint condition, when the system filters the chatlogs in connection with the "next" 203 icon, the system will filter the chatlogs in view of the breakpoint condition. The developer can also set more than one breakpoint at a time.

The user interface also provides an icon, button, or other user input interface, for example, a "Cont" icon 206, that advances the current conversation to the breakpoint that was set using the "Set breakpoints" icon 205. The system automatically generates user inputs in order to advance the current conversation to the breakpoint. As described above, the system filters the chatlogs to identify which chatlogs include the identified breakpoint. From the clustered set of chatlogs the system may randomly select a chatlog or chatlog conversation to provide the user inputs to advance to the desired breakpoint. The system then updates the local chatlog repository with additions of the user inputs that were provided to advance to the breakpoint location. The system additionally updates the user interface to depict the user inputs and responses by the conversational agent that were provided to advance to the breakpoint and also updates the local conversational context. In other words, the system updates the conversational agent, the user interface, and the chatlog repository with the information needed to illustrate the responses that were automatically generated by the system as user inputs and the responses of the conversational agent to advance to the desired breakpoint.

Thus, the described system and method provide a technique for identifying the effectiveness of a conversational agent by automatically parsing and analyzing chat or execution logs without requiring a developer to undergo the time-consuming, tedious, and ineffective manual process of analyzing the chat logs. Additionally, the system provides a user interface that allows for advancement through the dialog flow corresponding to the conversational agent based upon the chatlogs that allows the developer to analyze the conversational agent in a debug-mode type environment. Thus, the systems and methods as described herein provide a more user-friendly and intuitive approach to analysis of unstructured, lengthy, and difficult to browse chatlogs that is not possible using conventional manual methods and techniques.

Figure 3:
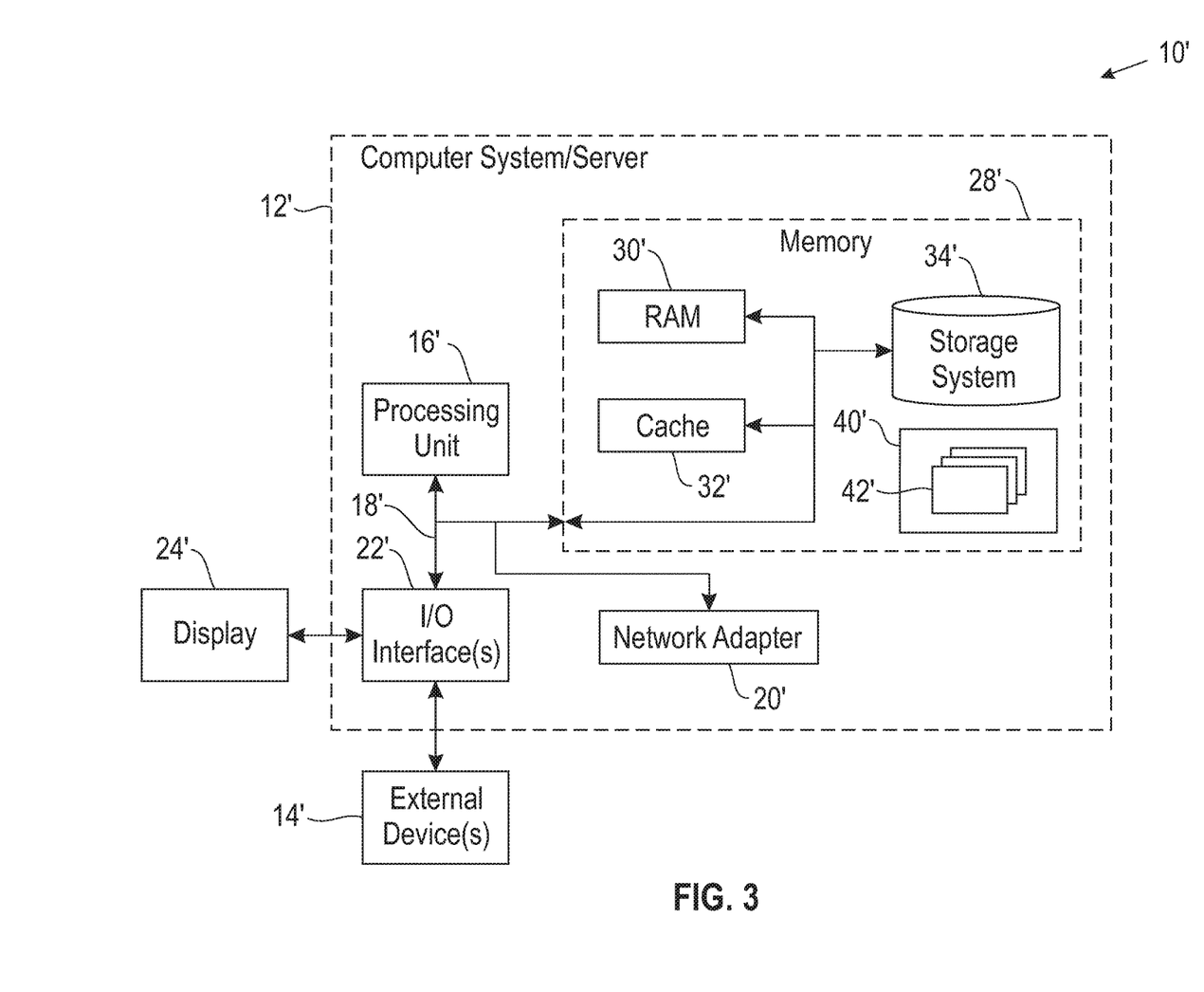
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    obtaining a plurality of chatlogs involving a conversational agent, wherein the plurality of chatlogs represent interactions between users and the conversational agent, wherein the conversational agent comprises a computer-based assistant that is programmed by a developer by programming dialog flows for the conversational agent;
    identifying, from the plurality of chatlogs, dialog states of the conversational agent, wherein each dialog state corresponds to a node within at least one of the dialog flows corresponding to a response provided by the conversational agent during at least one of the interactions, wherein the identifying comprises identifying a plurality of conversational turns within the plurality of chatlogs and classifying a conversational turn provided by the conversational agent into a dialog state;
    generating, from the plurality of chatlogs, a dialog tree including one or more of the dialog flows of the conversational agent, wherein a dialog flow represents a programmed conversational flow of the conversational agent and wherein the one or more of the dialog flows included in the dialog tree corresponds to an accessed dialog flow during an interaction that occurred between the conversational agent and a user and wherein the dialog tree (i) includes dialog states of the conversational agent occurring within the plurality of chatlogs and (ii) identifies the frequency of transitions between identified dialog states as identified from the plurality of chatlogs; and
    providing a conversational reflow user interface for a conversational reflow system, the conversational reflow system allowing execution of the conversational agent to mimic interactions between users and the conversational agent and allowing a user to select a particular interaction, wherein the execution is based upon the dialog tree, wherein the conversational reflow system advances through dialog flows based upon input provided by the user at the conversational reflow user interface and the conversational reflow user interface displays output based upon the dialog states of the dialog tree.

2. The method of claim 1, wherein the conversational reflow user interface provides a standard mode that advances through the dialog flow based upon user responses provided by a user.

3. The method of claim 1, wherein the identifying dialog states further comprises (i) accessing a model corresponding to the conversational agent and (ii) identifying dialog states from the accessed model.

4. The method of claim 1, wherein the dialog tree comprises a plurality of (i) nodes and (ii) edges, each edge connecting two of the plurality of nodes, wherein the nodes represent dialog states and wherein the edges represent the frequency of transitions between the connected nodes.

5. The method of claim 4, wherein each edge has a corresponding cluster of user utterances representing user responses that result in the transition from one dialog state connected by the edge to a second dialog state connected by the edge.

6. The method of claim 1, wherein the conversational reflow user interface provides an auto mode that advances through the dialog flow by automatically generating user utterances to transition from one dialog state to another dialog state.

7. The method of claim 6, wherein the conversational reflow user interface provides an icon that generates a dialog flow breakpoint.

8. The method of claim 7, wherein the conversational reflow user interface provides an icon that, in auto mode, causes the conversational reflow system to advance through the dialog flow automatically to the dialog flow breakpoint.

9. The method of claim 1, wherein the conversational reflow user interface provides an icon that returns to a previous dialog state.

10. A method, comprising:
    obtaining a plurality of execution logs involving a conversational agent, wherein the plurality of execution logs represent interactions of users with the conversational agent, wherein the conversational agent comprises a computer-based assistant that is programmed by a developer by programming dialog flows for the conversational agent;
    producing, from the plurality of execution logs, a dialog tree including one or more dialog flows of the conversational agent, wherein a dialog flow represents a programmed conversational flow of the conversational agent and wherein the one or more of the dialog flows included in the dialog tree corresponds to an accessed dialog flow during an interaction that occurred between the conversational agent and a user during at least one of the interactions and wherein the dialog tree (i) includes dialog states of the conversational agent and (ii) identifies the frequency of transitions between dialog states of the conversational agent as identified from the plurality of execution logs, wherein a dialog state corresponds to a conversational turn provided by the conversational agent during at least one of the interactions;
    the dialog tree comprising (i) a plurality of nodes within at least one of the one or more dialog flows, each node corresponding to a dialog state, and (ii) a plurality of edges connecting two of the plurality of nodes, each edge corresponding to one or more user responses that result in a transition from one of the nodes connected by the edge to the other of the nodes connected by the edge; and providing a conversational agent dialog flow user interface for a conversational agent system, the conversational agent system allowing execution of the conversational agent to mimic interactions between users and the conversational agent and allowing a user to select a particular interaction, wherein the execution is based upon the dialog tree, wherein the conversational reflow system advances through dialog flows based upon input provided by a user at the conversational reflow user interface and the conversational reflow user interface displays output based upon the dialog states of the dialog tree.

11. An apparatus, comprising:

at least one processor; and a computer readable storage medium having computer readable program code embodied therewith and executable by the at least one processor, the computer readable program code comprising:

computer readable program code configured to obtain a plurality of chatlogs involving a conversational agent, wherein the plurality of chatlogs represent interactions between users and the conversational agent, wherein the conversational agent comprises a computer-based assistant that is programmed by a developer by programming dialog flows for the conversational agent;

computer readable program code configured to identify, from the plurality of chatlogs, dialog states of the conversational agent, wherein each dialog state corresponds to a node within one of the dialog flows corresponding to a response provided by the conversational agent during at least one of the interactions, wherein the identifying comprises identifying a plurality of conversational turns within the plurality of chatlogs and classifying a conversational turn provided by the conversational agent into a dialog state;

computer readable program code configured to generate, from the plurality of chatlogs, a dialog tree including one or more of the dialog flows of the conversational agent, wherein a dialog flow represents a programmed conversational flow of the conversational agent and wherein the one or more of the dialog flows included in the dialog tree corresponds to an accessed dialog flow during an interaction that occurred between the conversational agent and a user and wherein the dialog tree (i) includes dialog states of the conversational agent occurring within the plurality of chatlogs and (ii) identifies the frequency of transitions between identified dialog states as identified from the plurality of chatlogs; and computer readable program code configured to provide a conversational reflow user interface for a conversational reflow system, the conversational reflow system allowing execution of the conversational agent to mimic interactions between users and the conversational agent and allowing a user to select a particular interaction, wherein the execution is based upon the dialog tree, wherein the conversational reflow system advances through dialog flows based upon input provided by the user at the conversational reflow user interface and the conversational reflow user interface displays output based upon the dialog states of the dialog tree.

12. A computer program product, comprising:

a computer readable storage medium having computer readable program code embodied therewith, the computer readable program code executable by a processor and comprising:

computer readable program code configured to obtain a plurality of chatlogs involving a conversational agent, wherein the plurality of chatlogs represent interactions between users and the conversational agent, wherein the conversational agent comprises a computer-based assistant that is programmed by a developer by programming dialog flows for the conversational agent;

computer readable program code configured to identify, from the plurality of chatlogs, dialog states of the conversational agent, wherein each dialog state corresponds to a node within one of the dialog flows corresponding to a response provided by the conversational agent during at least one of the interactions, wherein the identifying comprises identifying a plurality of conversational turns within the plurality of chatlogs and classifying a conversational turn provided by the conversational agent into a dialog state;

computer readable program code configured to generate, from the plurality of chatlogs, a dialog tree including one or more of the dialog flows of the conversational agent, wherein a dialog flow represents a programmed conversational flow of the conversational agent and wherein the one or more of the dialog flows included in the dialog tree corresponds to an accessed dialog flow during an interaction that occurred between the conversational agent and a user and wherein the dialog tree (i) includes dialog states of the conversational agent occurring within the plurality of chatlogs and (ii) identifies the frequency of transitions between identified dialog states as identified from the plurality of chatlogs; and computer readable program code configured to provide a conversational reflow user interface for a conversational reflow system, the conversational reflow system allowing execution of the conversational agent to mimic interactions between users and the conversational agent and allowing a user to select a particular interaction, wherein the execution is based upon the dialog tree, wherein the conversational reflow system advances through dialog flows based upon input provided by the user at the conversational reflow user interface and the conversational reflow user interface displays output based upon the dialog states of the dialog tree.

13. The computer program product of claim 12, wherein the conversational reflow user interface provides an icon that returns to a previous dialog state.

14. The computer program product of claim 12, wherein the identifying dialog states further comprises (i) accessing a model corresponding to the conversational agent and (ii) identifying dialog states from the accessed model.

15. The computer program product of claim 12, wherein the dialog tree comprises a plurality of (i) nodes and (ii) edges, each edge connecting two of the plurality of nodes;

wherein the nodes represent dialog states and wherein the edges represent the frequency of transitions between the connected nodes; and wherein each edge has a corresponding cluster of user utterances representing user responses that result in the transition from one dialog state connected by the edge to a second dialog state connected by the edge.

16. The computer program product of claim 12, wherein the conversational reflow user interface provides an auto mode that advances through the dialog flow by automatically generating user utterances to transition from one dialog state to another dialog state.

17. The computer program product of claim 16, wherein the conversational reflow user interface provides an icon that generates a dialog flow breakpoint.

18. The computer program product of claim 17, wherein the conversational reflow user interface provides an icon that, in auto mode, causes the conversational reflow system to advance through the dialog flow automatically to the dialog flow breakpoint.

\* \* \* \* \*